No. 748,708. Patented January 5, 1904.

UNITED STATES PATENT OFFICE.

HENRY V. DUNHAM, OF NEW YORK, N. Y., ASSIGNOR TO CASEIN COMPANY OF AMERICA, A CORPORATION OF NEW JERSEY.

INSOLUBLE GELATINOUS PRODUCT AND PROCESS OF PRODUCING SAME.

SPECIFICATION forming part of Letters Patent No. 748,708, dated January 5, 1904.

Application filed April 21, 1902. Serial No. 103,360. (No specimens.)

*To all whom it may concern:*

Be it known that I, HENRY V. DUNHAM, a citizen of the United States, residing at New York, in the county of New York and State of New York, have invented or discovered certain new and useful Improvements in Insoluble Gelatinous Products and Processes of Producing Same, of which the following is a specification.

I have discovered that by treating a gelatinous solution with hexamethylene-tetramine and subsequently drying out this solution on a cloth or otherwise to form a thin sheet or film and then steaming the gelatinous sheet or film at a temperature of 180° Fahrenheit or above or by subjecting it to a weak solution of hot acids (preferably boracic acid) such gelatinous sheet or film is rendered insoluble and the product is of such a character as to be suitable for use in the arts, as in paper-coating, &c., as a substitute for egg or blood albumen coagulated by heat, this substitute, however, being produced at very much less cost than the albumens referred to.

In practicing my invention or discovery I take about eighty-five parts of ordinary dry commercial animal glue or dry animal or vegetable gelatin and dissolve the same in about two hundred parts of water. To this mixture is added about fifteen parts of hexamethylene-tetramine. These proportions are all by weight. Any desired pigments for the purpose of coloring or inert material may be added to the resulting mixture, if desired. The solution is then dried out in any suitable way in the form of a film, or it may be dried out by pressing the mixture into the meshes of a cloth and allowing it to dry in the form of a thin sheet. When the sheet or film is dried either on a cloth or in any other manner, it is subjected to steam under pressure of about five pounds per square inch and at a temperature of 180° Fahrenheit or above for about half an hour, and owing to this treatment it is rendered insoluble, or instead of subjecting the gelatinous film to steam it may be rapidly run through a hot five-per-cent. solution of acid (preferably boracic acid) heated to 180° or somewhat higher and is by this treatment rendered insoluble.

I do not wish to be understood as limiting my invention or discovery to the exact proportions hereinbefore stated, as these may be varied somewhat without materially altering the result at which I am aiming—to wit, an insoluble gelatinous product of such a character that it may be used in the arts as a substitute for insoluble egg or blood albumen.

Having thus described my invention or discovery, I claim and desire to secure by Letters Patent—

1. The herein-described insoluble gelatinous product, suitable for use as a substitute for albumen, the same consisting of a mixture of about eighty-five parts of a gelatinous substance with about fifteen parts of hexamethylene-tetramine.

2. The herein-described process for producing an insoluble gelatinous product, the same consisting in dissolving a dry gelatinous substance in water, then adding hexamethylene-tetramine to the solution, then drying the solution, and subsequently subjecting the dried-out product to heat and moisture.

3. The herein-described process for producing an insoluble gelatinous product, the same consisting in dissolving about eighty-five parts of an ordinary dry commercial gelatinous substance in about two hundred parts of water, then adding to the solution about fifteen parts of hexamethylene-tetramine, then drying the solution, and subsequently subjecting the dried-out product to the simultaneous action of heat and moisture.

4. The herein-described process for producing an insoluble gelatinous product, the same consisting in dissolving about eighty-five parts of an ordinary dry commercial gelatinous substance in about two hundred parts of water, then adding to the solution about fifteen parts of hexamethylene-tetramine, then drying the solution, and substantially subjecting the dried-out product to the action of steam at a temperature of about 180° Fahrenheit, or above, for about half an hour.

In testimony whereof I affix my signature in presence of two witnesses.

HENRY V. DUNHAM.

Witnesses:
H. HIBBS BROOKS,
A. A. DUNHAM.